United States Patent [19]
Angelo

[11] Patent Number: 5,949,882
[45] Date of Patent: *Sep. 7, 1999

[54] METHOD AND APPARATUS FOR ALLOWING ACCESS TO SECURED COMPUTER RESOURCES BY UTILZING A PASSWORD AND AN EXTERNAL ENCRYPTION ALGORITHM

[75] Inventor: Michael F. Angelo, Houston, Tex.

[73] Assignee: Compaq Computer Corporation, Houston, Tex.

[*] Notice: This patent is subject to a terminal disclaimer.

[21] Appl. No.: 08/766,721

[22] Filed: Dec. 13, 1996

[51] Int. Cl.$^6$ ................. H04L 9/00; H04L 9/08
[52] U.S. Cl. ................. 380/25; 380/4; 380/21; 380/23; 380/49; 380/50; 340/825.31; 340/825.34; 235/380; 395/186; 395/187.01; 395/188.01
[58] Field of Search .................. 380/23, 25, 4, 380/24, 49, 50, 21, 9; 340/825.31, 825.34; 395/186, 187.01, 188.01; 235/379, 380

[56] References Cited

U.S. PATENT DOCUMENTS

| | | |
|---|---|---|
| 4,405,829 | 9/1983 | Rivest et al. . |
| 4,799,258 | 1/1989 | Davies . |
| 4,890,323 | 12/1989 | Beker et al. . |
| 4,969,188 | 11/1990 | Schöbi ................. 380/23 |
| 5,276,737 | 1/1994 | Micali . |
| 5,315,658 | 5/1994 | Micali . |
| 5,375,243 | 12/1994 | Parzych et al. . |
| 5,377,269 | 12/1994 | Heptig et al. ................. 380/25 |
| 5,432,851 | 7/1995 | Scheidt et al. ................. 380/25 |
| 5,485,519 | 1/1996 | Weiss ................. 380/23 |
| 5,511,122 | 4/1996 | Atkinson . |
| 5,537,540 | 7/1996 | Miller et al. . |
| 5,590,199 | 12/1996 | Krajewski et al. . |
| 5,666,415 | 9/1997 | Kaufman ................. 380/23 |

OTHER PUBLICATIONS

Applied Cryptography, Second Edition, pp. 1–74, 1996.
Electronic Design, Products Newsletter, p. 167, Nov. 1996.
Dallas Semiconductor, 64Kbit Touch Memory, DS1996, 1995.
Dallas Semiconductor, Touch Memory Starter Kit, DS9092K, 1995.
Dallas Semiconductor, Touch COM Port Adapter, DS9097/DS9097E, 1995.
Dallas Semiconductor Touch Multikey, DS1991, 1995.

Primary Examiner—Bernarr E. Gregory
Attorney, Agent, or Firm—Akin, Gump, Strauss Hauer & Feld

[57] ABSTRACT

A method for permitting access to secured computer resources based upon a two-piece user verification process. In one embodiment of the invention, the user verification process is carried out during a secure power-up procedure. At some point during the secure power-up procedure, the computer user is required to provide an external token or smart card that is coupled to the computer through specialized hardware. The token or smart card is used to store an encryption algorithm furnished with an encryption key that is unique or of limited production. The computer user is then required to enter a plain text user password. Once entered, the user password is encrypted using the encryption algorithm contained in the external token to create a peripheral password. The peripheral password is compared to a value stored in either secure system memory or in memory contained within a secured resource itself. If the two values match, access to the secured resource is permitted. In an alternate embodiment of the invention, the two-piece authentication process is conducted during normal computer operation outside of the secure power-on sequence. In this embodiment of the invention, the user password is entered by means of a secure keyboard communications channel. In either embodiment, the two-piece nature of the authorization process requires the presence of both the user password and the external token in order to generate the peripheral password.

19 Claims, 5 Drawing Sheets

METHOD AND APPARATUS FOR ALLOWING ACCESS TO SECURED COMPUTER RESOURCES BY UTILZING A PASSWORD AND AN EXTERNAL ENCRYPTION ALGORITHM

BACKGROUND OF THE INVENTION

1. Field of the Invention

The invention relates to security in a computer system, and more particularly to permitting access to secured computer resources based upon a system password derived from a plain text password and an external encryption algorithm.

2. Description of the Related Art

Large amounts of money are invested by companies and individuals to purchase computer hardware and software, and even more money is spent developing the information contained in data files such as text documents and spreadsheets. Protecting these investments can be critical to the success and reputation of a business. Public accounts of the exploits of computer "hackers"—as malicious code-breakers or eavesdroppers are sometimes called—have therefore focused and magnified corporate desires for more secure communications and better methods to protect data. The scope of the problem is undoubtedly even more serious than reported, given the reluctance of many businesses to report security breaches. As a result, security conscious users are requesting that security and integrity features be incorporated into their computers to restrict access to data contained on hard drives, as well as information contained in other critical system components.

One known approach to security involves encryption or cryptography. Cryptography is typically used to protect both data and communications. Generally, the original message or data item is referred to as "plain text", while "encryption" denotes the process of disguising or altering a message in such a way that its substance is not readily discernable. An encrypted message is called "ciphertext". Ciphertext is returned to plain text by an inverse operation referred to as "decryption". Encryption is typically accomplished through the use of a cryptographic algorithm, which is essentially a mathematical function. There are many types of cryptographic algorithms, providing varying levels of security.

The most common cryptographic algorithms are key-based, where special knowledge of variable information called a "key" is required to decrypt ciphertext. There are two prevalent types of key-based algorithms: "symmetric" (also called secret key or single key algorithms) and "public key" (also called asymmetric algorithms). The security in these algorithms is centered around the keys—not the details of the algorithm itself. This makes it possible to publish the algorithm for public scrutiny and then mass produce it for incorporation into security products.

In most symmetric algorithms, the encryption key and the decryption key are the same. This single key encryption arrangement is not flaw-free. The sender and recipient of a message must somehow exchange information regarding the secret key. Each side must trust the other not to disclose the key. Further, the sender must generally communicate the key via another media (similar to a bank sending the personal identification number for an ATM card through the mail). This arrangement is not practical when, for example, the parties interact electronically for the first time over a network. The number of keys also increases rapidly as the number of users increases.

With public key algorithms, by comparison, the key used for encryption is different from the key used for decryption. It is generally very difficult to calculate the decryption key from an encryption key. In typical operation, the "public key" used for encryption is made public via a readily accessible directory, while the corresponding "private key" used for decryption is known only to the recipient of the ciphertext. In an exemplary public key transaction, a sender retrieves the recipient's public key and uses it to encrypt the message prior to sending it. The recipient then decrypts the message with the corresponding private key. It is also possible to encrypt a message using a private key and decrypt it using a public key. This is sometimes used in digital signatures to authenticate the source of a message.

One problem with public key algorithms is speed. Public key algorithms are typically on the order of 1,000 times slower than symmetric algorithms. This is one reason that secure communications are often implemented using a hybrid cryptosystem. In such a system, one party encrypts a random "session key" with the other party's public key. The receiving party recovers the session key by decrypting it with his/her private key. All further communications are encrypted using the same session key (which effectively is a secret key) and a symmetric algorithm.

The number of cryptographic algorithms is constantly growing. The two most popular are DES (Data Encryption Standard) and RSA (named after its inventors—Rivest, Shamir, and Adleman). DES is a symmetric algorithm with a fixed key length of 56 bits. RSA is a public key algorithm that can be used for both encryption and digital signatures. DSA (Digital Signature Algorithm) is another popular public key algorithm that is only used for digital signatures. With any of these algorithms, the relative difficulty of breaking an encrypted message by guessing a key with a brute force attack is proportional to the length of the key. For example, if the key is 40 bits long, the total number of possible keys ($2^{40}$) is about 110 billion. Given the computational power of modern computers, this value is often considered inadequate. By comparison, a key length of 56 bits provides 65,636 times as many possible values as the 40 bit key.

While much attention has been given to protecting communications and data as they are transmitted via internal networks (intranets) and external networks (such as the Internet), few security improvements have focused on the hardware itself. One known method of offering limited access to hardware and the data it contains is by the use of passwords. A password is typically stored in battery-backed CMOS RAM memory. Before the user is allowed access to the computer or secured computer resources, the user is required to enter a password. Once a password is entered, the computer's power-on routines compares the password to the password in CMOS memory and, if they match, the user is allowed access.

A main disadvantage of this system is that certain forms of attack can bypass the CMOS memory because in many cases it is not read protected. To address this concern, the password can be encoded. Most encoding schemes can be reverse engineered by a sophisticated computer virus or malicious code, however, potentially leading to a costly security breach. Further, the CMOS memory could simply be disconnected from its battery, causing the loss of the password and any other contents.

Physical keys or tokens, such as those used to unlock a door, have also been used to permit access to a computer system. Like the password approach, this type of security is "one-piece" in nature, and is compromised if the key or token is stolen. Anyone possessing the key can gain access to the computer's data and is accorded the same level of access as the authorized user.

Providing sufficient security can be particularly difficult for portable computers. Unlike their desktop counterparts, portable computers are easily stolen. Once stolen, the security afforded by physical keys or passwords used to protect data stored on a hard drive or other mass storage devices is readily bypassed. For example, it is a simple procedure to physically remove the hard drive unit from the stolen computer—which is password protected—and install it in a second computer system. Because the surrogate computer system may not employ password protection or the password may be known, the hard drive unit or other mass storage device becomes readily accessible to an unauthorized user and its data is vulnerable to theft and misuse.

To prevent unauthorized access of this sort, the data may be encrypted before it is placed on the hard drive, rendering the data meaningless until it is decoded. Encryption, however, reduces the computer system's performance due to the delay associated with the encryption process. To confront this problem, hard drives have been created which prevent data access operations on the hard drive upon power-up until the user enters a password. The password is located on the disk itself to prevent bypassing the hard drive security by installation in a new computer system. This type of security, while generally effective, is again one-piece in nature and is only as secure as the password itself. Currently, there exists no satisfactory method of protecting vulnerable or stolen computer equipment and the data it might contain from unauthorized access.

SUMMARY OF THE INVENTION

Briefly, a computer system according to the present invention utilizes a two-piece authentication procedure to enable access to secured computer resources. In one embodiment of the invention, the password verification process is carried out during a secure power-up procedure. At some point during the secure power-up procedure, the computer system checks for the presence of an external token or smart card that is coupled to the computer through specialized hardware. The token or smart card is used to store an encryption algorithm furnished with an encryption key that is unique or of limited production.

Following detection of the external token, the computer user is required to enter a plain text user password. Once entered, the user password is encrypted using the encryption algorithm contained in the external token, thereby creating a "peripheral" password. The peripheral password is compared to a value stored in either secure system memory or in memory contained within a secured resource itself. If the two values match, access to the secured resource is permitted.

In an alternate embodiment of the invention, the two-piece authentication process is conducted during normal computer operation outside of the secure power-on sequence. In this embodiment of the invention, the user password is entered by means of a secure keyboard communications channel. Again, the stored password value is maintained in either secure system memory or in a secured resource such as a hard drive. If the password is stored in the secured resource, the resource can be moved to other computer systems but cannot be accessed without the authorized user's password and token. The two-piece nature of the authentication process is advantageous due to the fact that if either the user password or the external token is stolen, it is of little value. Both pieces are required to access protected resources.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following patents and applications are hereby incorporated by reference:

Commonly-assigned U.S. Pat. No. 5,537,540, entitled "TRANSPARENT, SECURE COMPUTER VIRUS DETECTION METHOD AND APPARATUS", referred to as the "SAFESTART patent";

Commonly-assigned U.S. patent application Ser. No. 08/398,343, entitled, "SECURITY CONTROL FOR A PERSONAL COMPUTER," filed on Mar. 3, 1995, now abandoned;

Commonly-assigned U.S. Pat. No. 5,375,243, entitled "HARD DISK PASSWORD SECURITY SYSTEM";

Commonly-assigned U.S. patent application Ser. No. 08/632,892, entitled "SECURE POWER SUPPLY," filed on Apr. 16, 1996, now U.S. Pat. No. 5,751,950; and Commonly-assigned U.S. patent application Ser. No. 08/657,982, entitled "METHOD AND APPARATUS FOR PROVIDING SECURE AND PRIVATE KEYBOARD COMMUNICATIONS IN COMPUTER SYSTEMS", filed on May 29, 1996, now U.S. Pat. No. 5,748,888.

Figure 1:
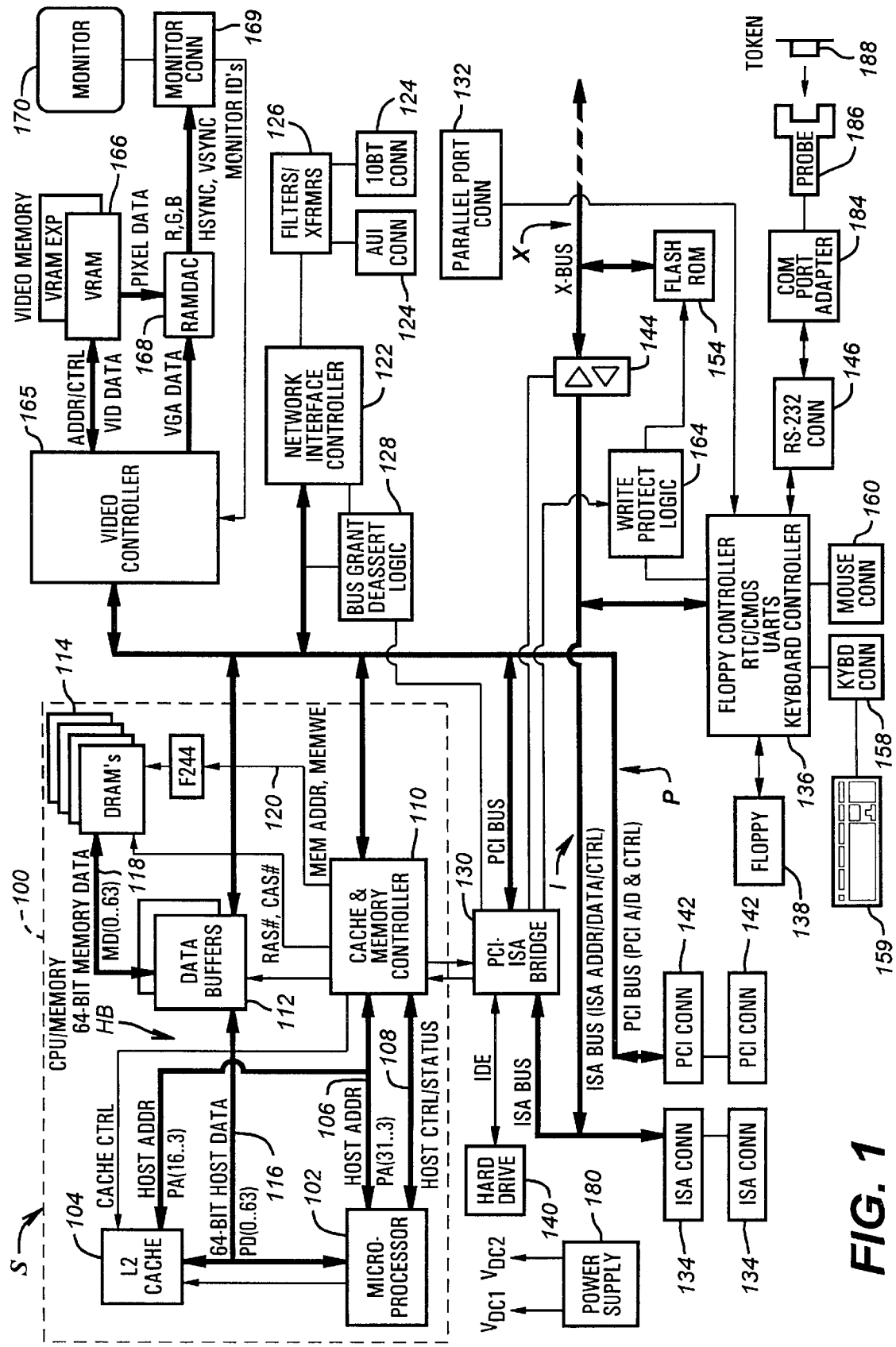
FIG. 1 is a schematic block diagram of a computer system incorporating capabilities for securely allowing access to secured resources by utilizing an external encryption algorithm.

Referring first to FIG. 1, a computer system S according to the present invention is shown. In the preferred embodiment, the system S incorporates two primary buses: a Peripheral Component Interconnect (PCI) bus P which includes an address/data portion and a control signal portion; and an Industry Standard Architecture (ISA) bus I which includes an address portion, a data portion, and a control signal portion. The PCI and ISA buses P and I form the architectural backbone of the computer system S.

A CPU/memory subsystem 100 is connected to the PCI bus P. The processor 102 is preferably the Pentium® processor from Intel Corporation, but could be an 80486 or any number of similar or next-generation processors. The processor 102 drives data, address, and control portions 116, 106, and 108 of a host bus HB. A level 2 (L2) or external cache memory 104 is connected to the host bus HB to provide additional caching capabilities that improve the overall performance of the computer system S. The L2 cache 104 may be permanently installed or may be removable if desired. A cache and memory controller 110 and a PCI-ISA bridge chip 130 are connected to the control and address portions 108 and 106 of the host bus HB. The cache and memory controller chip 110 is configured to control a series of data buffers 112. The data buffers 112 are preferably the 82433LX from Intel, and are coupled to and drive the host data bus 116 and a MD or memory data bus 118 that is connected to a memory array 114. A memory address and memory control signal bus is provided from the cache and memory controller 110.

The data buffers 112, cache and memory controller 110, and PCI-ISA bridge 130 are all connected to the PCI bus P. The PCI-ISA bridge 130 is used to convert signals between the PCI bus P and the ISA bus I. The PCI-ISA bridge 130 includes: the necessary address and data buffers, arbitration and bus master control logic for the PCI bus P, ISA arbitration circuitry, an ISA bus controller as conventionally used in ISA systems, an IDE (intelligent drive electronics) interface, and a DMA controller. A hard disk drive 140 is connected to the IDE interface of the PCI-ISA bridge 130. Tape drives, CD-ROM devices or other peripheral storage devices (not shown) can be similarly connected.

In the disclosed embodiment, the PCI-ISA bridge 130 also includes miscellaneous system logic. This miscellaneous system logic contains counters and activity timers as conventionally present in personal computer systems, an interrupt controller for both the PCI and ISA buses P and I, and power management logic. Additionally, the miscellaneous system logic may include circuitry for a security management system used for password verification and to allow access to protected resources as described more fully below.

The PCI-ISA bridge 130 also includes circuitry to generate a "soft" SMI (System Management Interrupt), as well as SMI and keyboard controller interface circuitry. The miscellaneous system logic is connected to the flash ROM 154 through write protection logic 164. As discussed below, separate enable/interrupt signals are also communicated from the PCI-ISA bridge 130 to the power supply 180 and the hard drive 140. Preferably, the PCI-ISA bridge 130 is a single integrated circuit, but other combinations are possible.

A series of ISA slots 134 are connected to the ISA bus I to receive ISA adapter cards. A series of PCI slots 142 are similarly provided on the PCI bus P to receive PCI adapter cards.

A video controller 165 is also connected to the PCI bus P. Video memory 166 is used to store graphics data and is connected to the video graphics controller 165 and a digital/analog converter (RAMDAC) 168. The video graphics controller 165 controls the operation of the video memory 166, allowing data to be written and retrieved as required. A monitor connector 169 is connected to the RAMDAC 168 for connecting a monitor 170.

A network interface controller (NIC) 122 is also connected to the PCI bus P. Preferably, the controller 122 is a single integrated circuit that includes the capabilities necessary to act as a PCI bus master and slave, as well as circuitry required to act as an Ethernet interface. Attachment Unit Interface (AUI) and 10 base-T connectors 124 are provided in the system S, and are connected to the NIC 122 via filter and transformer circuitry 126. This circuitry forms a network or Ethernet connection for connecting the computer system S to a local area network (LAN).

A combination I/O chip 136 is connected to the ISA bus I. The combination I/O chip 136 preferably includes a real time clock, two UARTS, a floppy disk controller for controlling a floppy disk drive 138, and various address decode logic and security logic to control access to an internal or external CMOS/NVRAM memory (not shown) and stored password values. Further details of contemplated uses of the NVRAM memory are provided below. Additionally, a control line is provided to the read and write protection logic 164 to further control access to the flash ROM 154. Serial port connectors 146 and parallel port connector 132 are also connected to the combination I/O chip 136.

An 8042, or keyboard controller, is also included in the combination I/O chip 136. The keyboard controller is of conventional design and is connected in turn to a keyboard connector 158 and a mouse or pointing device connector 160. A keyboard 159 is connected to the computer system S through the keyboard connector 158.

A buffer 144 is connected to the ISA bus I to provide an additional X-bus X for various additional components of the computer system S. A flash ROM 154 receives its control, address and data signals from the X-bus X. Preferably, the flash ROM 154 contains the BIOS information for the computer system and can be reprogrammed to allow for revisions of the BIOS.

In the disclosed embodiment, the computer system S contains circuitry for communicating with a removable cryptographic token 188. The precise physical nature of the token 188 is not considered critical to the invention. The token can take many forms, including a memory device such as a Touch Memory™ device supplied by Dallas Semiconductor, Inc., a smart card, or an encryption card. Preferably, the token 188 is easily decoupled from the computer system S and easily transportable by the token bearer. The token 188 contains at least one of a variety of encryption algorithms (such as DES, Blowfish, elliptic curve-based algorithms, etc.). Although the base algorithm can be the same in each token 188, it is preferable that the encryption key be different in each token 188. Ideally, the token 188 is capable of communicating digitally with the computer system S during momentary contact with or proximity to the computer system S. The token 188 of the disclosed embodiment is capable of storing the encryption algorithm in a non-volatile manner and can be permanently write-protected to discourage tampering.

In the disclosed embodiment of the invention, the circuitry used for establishing a communication link between the token 188 and the computer system S consists of a probe 186 connected to a COM or serial port adapter 184. The port adapter 184 is connected to the RS232 connector 146. In operation, the token 188 is detachably received by the probe 186. The probe 186 includes circuitry for reading and writing memory in the token 188, and can be fully powered through the RS232 connector 146. In addition, the probe 186 includes presence detector circuitry for ascertaining the presence of a token 188.

An additional feature of the computer system S is a System Management Mode (SMM), which is generally known to those skilled in the art. It is also noted that FIG. 1 presents an exemplary embodiment of the computer system S and it is understood that numerous other effective embodiments could readily be developed as known to those skilled in the art.

Figure 2A:
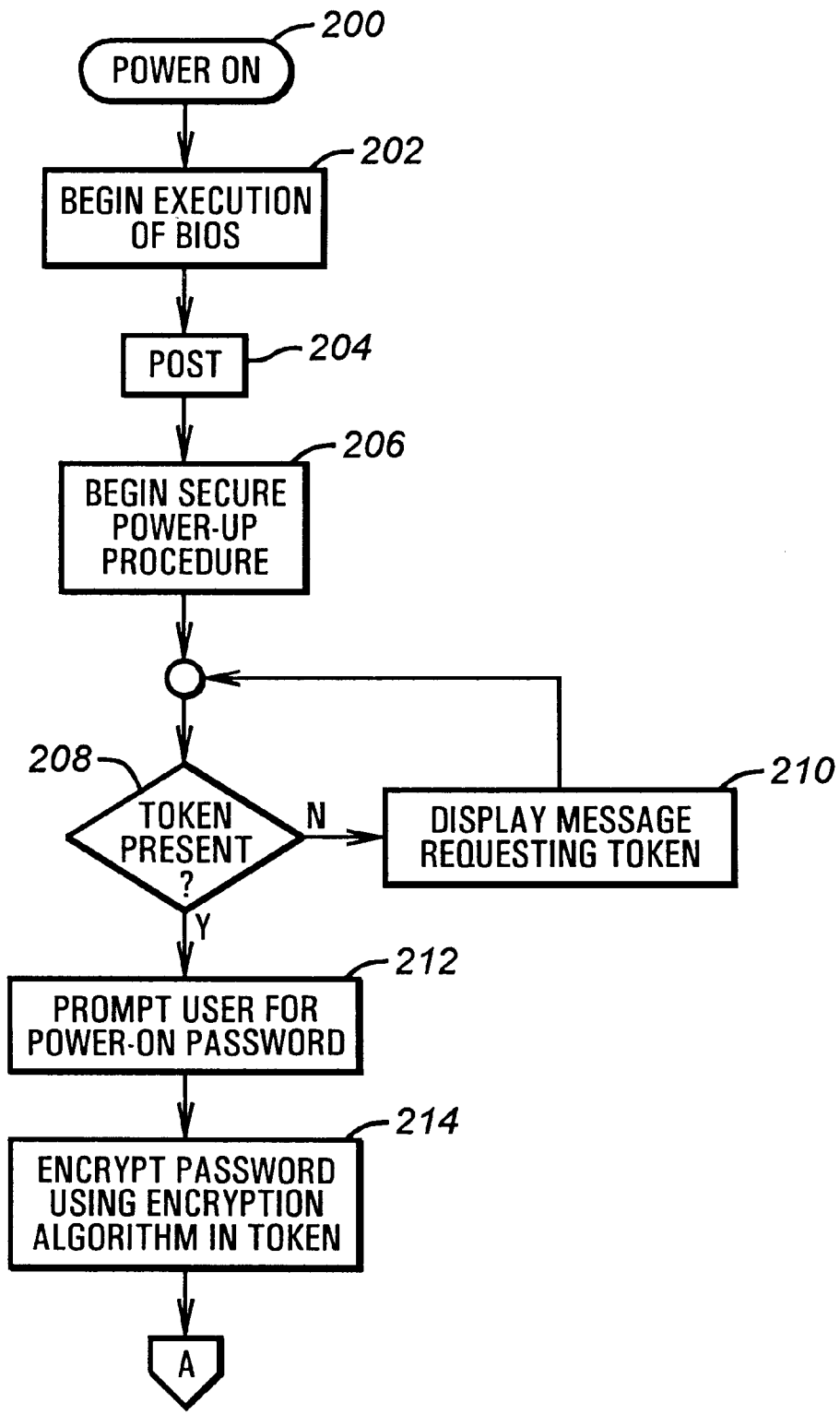
FIGS. 2A and 2B are flowchart diagrams illustrating a secure power-on sequence incorporating two-piece password verification and peripheral device enablement according to the present invention.
Figure 2B:
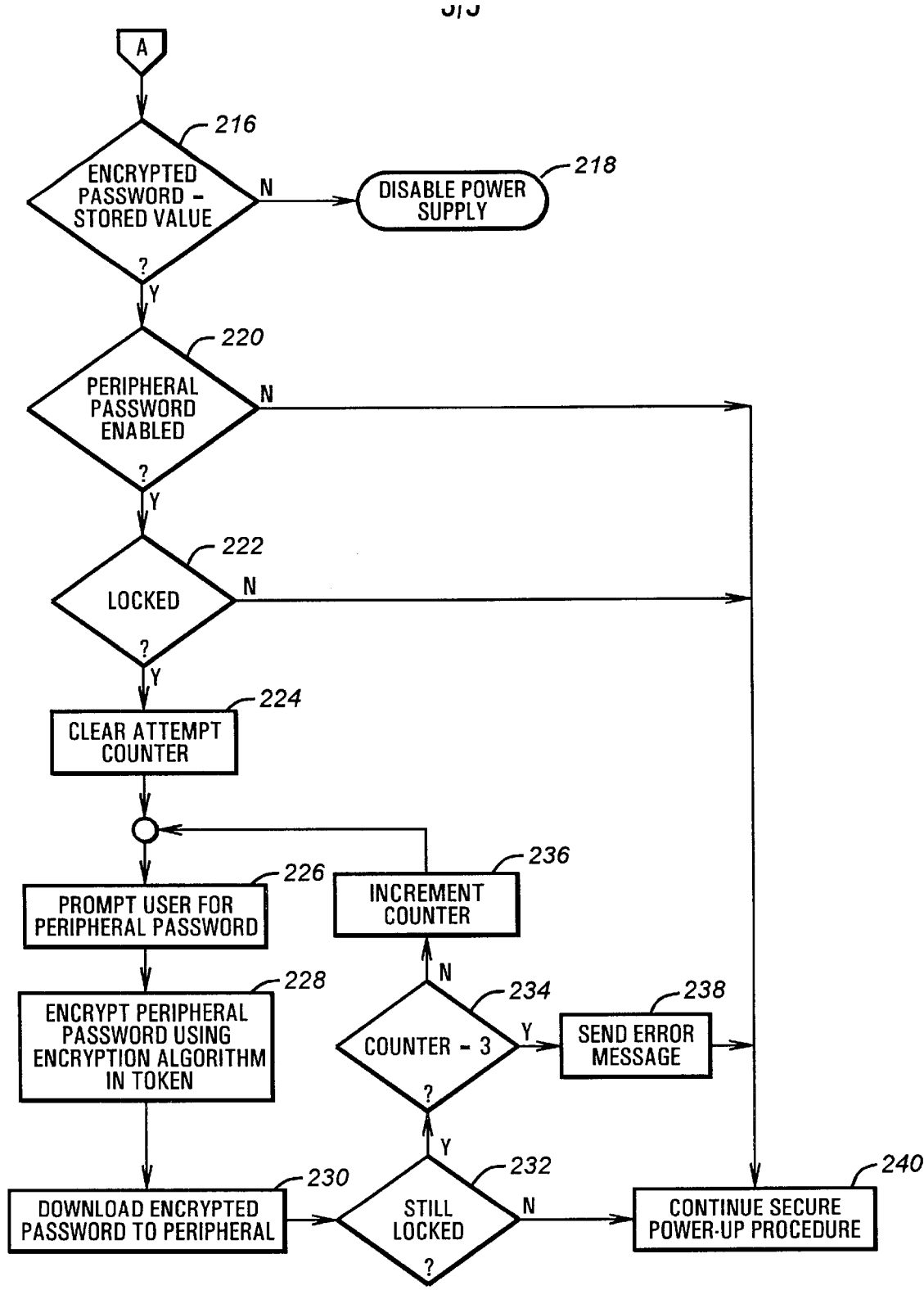

Referring now to FIGS. 2A and 2B, an exemplary power-on sequence incorporating two-piece user verification according to the invention is shown. The sequence builds upon a secure power-up procedure, such as that described in the SAFESTART patent. Briefly, this invention reduces the administrative requirements of earlier techniques. A reserved non-DOS hard disk partition is used to pre-boot the computer system and provide a secure environment from which to verify files. Upon power-up or reset, the computer performs the power-on self test (POST), during which it checks a SAFESTART track by comparing its hash value to a value stored in NVRAM. If the integrity of the SAFESTART track is verified, the first "SAFESTART" routine is loaded into memory and executed.

The SAFESTART routine first checks the master boot record and boot sectors of the hard disk. This verification captures a large majority of viruses and is performed before any code residing in those areas is executed, thus preventing the spread of any discovered viruses. Further checks are performed on SAFESTART files before each is executed. Eventually, system files and any additional designated user files are verified. Since the computer system was booted from an atypical partition, the drives are remapped to account for the shift in logical disk drive addressing. When the verification process is completed, SAFESTART files are cleaned up, a latch is set to prevent unauthorized modification of the initial hash values, and control is returned to the BIOS to boot the user operating system. Thus, a computer system implemented according to the SAFESTART patent insures that designated software and passwords are trustworthy following a power-up cycle.

As shown in FIG. 2A, when power to the computer system S is initially applied or the system undergoes a cold restart, the POWER-ON sequence 200 is commenced. In the first step 202 of the POWER-ON sequence 200 the computer system S begins executing from BIOS ROM. The BIOS is preferably stored in flash ROM 154 and contains low level programming for booting the operating system, and an interrupt handler for accessing the hard drive 140. Control then proceeds to step 204 where the computer system S performs a power-on self test (POST) to determine if all system hardware is operating properly.

Following additional power-on steps (optional), control next proceeds to step 206 for commencement of a secure power-up procedure such as that described in the SAFESTART patent. In the preferred embodiment, operating sequences for the secure power-up procedure are configured as an option ROM and located in the option ROM address space in a conventional manner. Preferably, the operating sequences are provided as the last option ROM in order to allow any other option ROM's to be installed at the outset. The system BIOS executes this portion of the secure power-on sequence as a part of its scan for option ROMs, which are executed when encountered in POST. This arrangement requires address decoding for the power-on sequence, but also simplifies distribution into a family of computer systems. Alternatively, the power-on sequence could be implemented as a direct call from the BIOS, rather than an option ROM call.

Control next proceeds to step 208 to determine if a token 188 containing an encryption algorithm is present. If the aforementioned presence detection circuitry determines that a token is not present, control loops to step 210 to display a message requesting that the user provide a token 188. When a token 188 is present as determined in step 208, control passes to step 212 where the user is prompted to enter a plain text power-on password. As an alternative to a memorized value, the plain text password could be generated with the aid of biometrics. For example, a scanned fingerprint could be converted into a plain text password value.

Control next proceeds to step 214 and the plain text password entered by the user is encrypted using the encryption algorithm provided by the external token 188. The encrypted plain text password effectively becomes the system password, and is referred to as such through throughout this specification. The encryption algorithm that is utilized can take many forms, including DES, RSA, DSA, RC2, RC4, Blowfish, IDEA, 3-WAY, and MDC among others. Ideally, the algorithm in each token 188 is enabled by an encryption key that is unique or of limited production, such that it is impractical or impossible to circumvent the verification process by using a substitute token.

It is contemplated that the actual encryption process could be carried out by the token 188 itself. In this embodiment of the invention, the plain text password is transmitted to the token 188 through the RS232 connector 146 or alternate connection port. The token 188 then performs the encryption procedure using its stored encryption algorithm and associated encryption key. Following the encryption process, the encrypted password is returned to the computer system S via the RS232 connector 146.

In an alternate embodiment of the invention, the encryption algorithm is downloaded into secure computer memory. After the user password has been entered, the encryption process is then performed by the computer system S. In this embodiment of the invention, it is desirable that the encryption algorithm be erased from the computer memory after completion of the encryption process and while the computer system S is still in the secure power-on period. This step prevents the encryption algorithm from being surreptitiously obtained from memory after the secure power-on period.

Following encryption of the password, control proceeds to step 216 of FIG. 2B, and the encrypted password value (i.e. the system password) is compared to a stored value. The stored value is preferably located in protected/locked NVRAM or Flash ROM 154, or in some other secure memory such as that disclosed in the previously incorporated "SECURITY CONTROL FOR A PERSONAL COMPUTER." That reference describes a security system in which system ROM provides a password at power-on to a security device (hereinafter referred to as the "black box" security device). The black box security device controls access to various secured resources of the computer system, such as the flash ROM 154 or any designated hardware peripheral devices. Once a password has been downloaded to the black box security device, a command to protect secured resources is issued to the security device. The command prevents unauthorized access to any of the secured resources. To access a secured resource, the user must thereafter provide the correct password to the black box security device. The security device can only verify—but does not divulge—the password, thereby enhancing system security. A multitude of passwords or other information can be protected with the black box security device.

Returning to FIG. 2B, if the encrypted password and the stored value are not equal as determined in step 216, control proceeds to step 218 and the power supply 180 is disabled. The resulting delay associated with re-booting the computer system discourages brute force attacks against the user password in situations where the external token has been misappropriated.

Several other options are available at this point. In one contemplated embodiment of the invention, the core components needed to boot the computer system S are powered by one supply voltage ($V_{DC1}$), while other secured components are powered by a second supply voltage ($V_{DC2}$).—A bifurcated power supply 180 according to this embodiment of the invention is discussed in greater detail in conjunction with FIG. 3. Devices powered by the second supply signal might include bay door/case locks and mass storage devices. Under this arrangement, the second power supply signal is initially disabled, but is turned on following detection of a valid system password. The system password used for this operation could be the same password generated in step 214, or a separate password that is generated at a later point (even outside of the secure power-up procedure). By requiring entry of a valid system password before enabling power to peripheral devices or unlocking bay door/case locks, the possessor of a stolen computer will usually be forced to physically damage the computer casing before gaining access to secured resources. The value of stolen computer equipment is thereby reduced, and computer theft is discouraged.

As shown in FIG. 2B, the secure power-up procedure can also include steps that provide password security for specified peripheral devices. In the disclosed embodiment of the invention, the procedure for gaining access to a single secured peripheral device begins at step 220 following detection of a valid system password in step 216. In step 220, the specified peripheral device is polled to determine if it is password enabled.

One device that could be secured in accordance with the invention is a disk drive such as that described in the previously incorporated "HARD DISK PASSWORD SECURITY SYSTEM." In a disk drive according to that invention, unauthorized access is prevented by placing an access password on the disk drive itself. When the computer system is powered up, the disk drive unit is in a LOCKED state and demands the password before access is allowed. No access to the disk drive—other than to wipe all of the data from the drive or to check the drive's status—is permitted until the password on the disk drive is received. If the user attempts to gain access to the disk drive by removing the drive from the original computer and placing it in another system, the disk drive remains inaccessible. Because the password is located on a secure portion of the disk drive instead of in the system CMOS, the disk will remain LOCKED regardless of the computer system in which it is operating. Circuitry is also included for preventing an unauthorized user from bypassing the security system by simply swapping the firmware controlling the disk drive.

If the disk drive or other secured peripheral is password enabled as determined in step 220, control passes to step 222 and the peripheral is examined to determine if it is locked. Ideally, the peripheral is locked each time power to the computer system S is cycled. If the specified peripheral device is not locked (i.e. the peripheral password is the same as the password generated in step 214), or if the peripheral device is not password enabled, control proceeds to step 240 and any remaining steps in the secure power-up procedure are completed.

If the peripheral device is locked, control proceeds to 224 and an optional attempt counter is cleared. Control then passes to step 226 and the computer user is prompted to enter a plain text password. Next, in step 228, the plain text password is encrypted with the encryption algorithm stored in the token 188 to generate a "peripheral" password. As discussed above, the encryption process can be completed in secure computer system S memory or in the token 188 itself.

In the disclosed embodiment of the invention, control next passes to step 230 where the peripheral password is downloaded to the secured peripheral for comparison to a value stored in the peripheral device's memory. The peripheral device remains in a locked state if the two values do not match. By storing the valid encrypted password value in the peripheral device's local memory, the peripheral device can be moved to another computer system and yet require the same user password and token 188 for access. Alternatively, the stored value could be maintained in secure computer system S memory such as the aforementioned black box security device.

After the peripheral password is downloaded and compared to a stored value, the peripheral device is polled in step 232 to determine if it is still locked. If it is not locked, control passes to step 240 and the secure power-up procedure is completed. If the peripheral device is still locked, control instead passes to step 234 to determine if the maximum number of allowed attempts (shown as 3) at generating the correct peripheral password has been reached. If not, the attempt counter is incremented in step 236 and control then returns to step 226 where the user is prompted to enter a new plain text password. If the maximum number of attempts is reached, control proceeds to step 238 for display of an optional error message. Control then passes to step 240 and the secure power-up procedure is completed.

It should be observed that in each of the embodiments of the invention described above, the user authentication or password verification process is two-piece in nature. If either the user password or the external token is misappropriated, it is of little value. Both pieces are required to generate the system password. In addition, the scope of the invention not considered to be limited to the disclosed secure power-up procedure. Likewise, the precise ordering of the power-up steps is not considered critical to the invention.

Figure 3A:
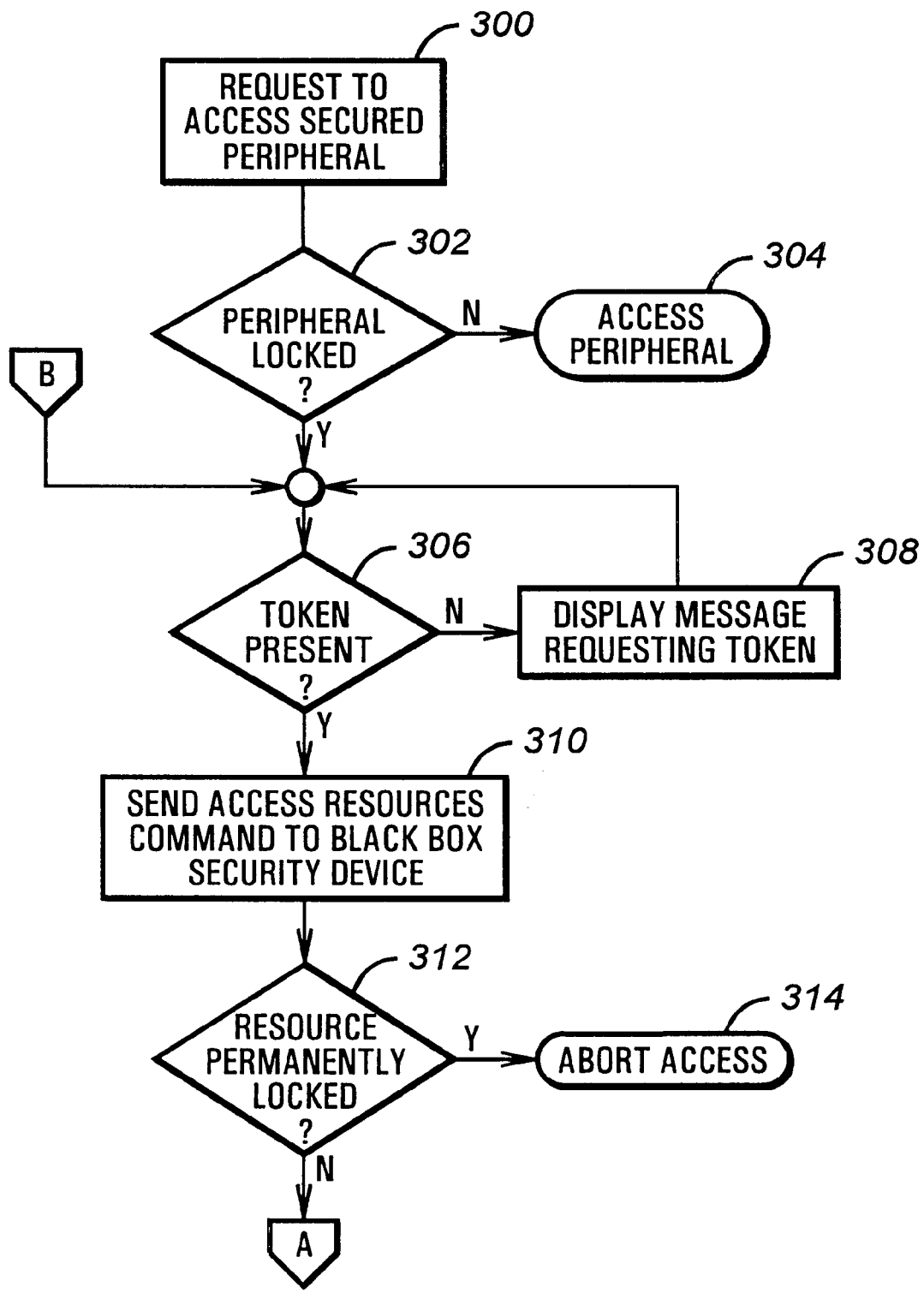
FIGS. 3A and 3B are flowchart diagrams illustrating a two-piece procedure according to the present invention for peripheral device enablement during normal computer operation outside of a secure power-up procedure.
Figure 3B:
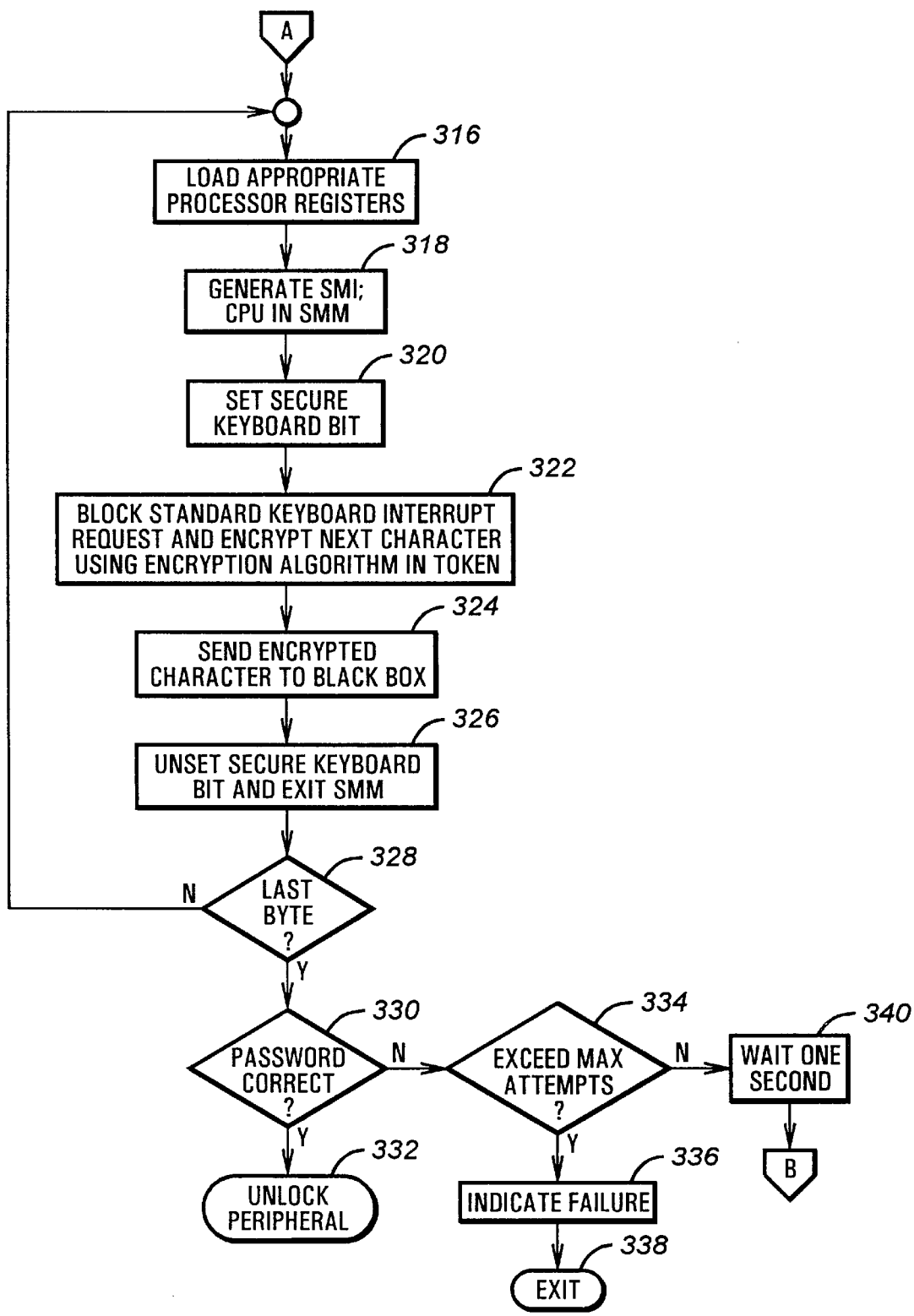

Referring now to FIGS. 3A and 3B, a procedure according to the present invention for securely entering a plain text password during normal system operation and encrypting it with the encryption algorithm stored in the token 188 is illustrated. In this embodiment of the invention, peripheral devices can be unlocked during normal system operation and outside of the secure power-up procedure. As described below, access to a secured peripheral device is controlled by the aforementioned black box security device, although other security devices could be similarly utilized. Access to the black box security device is provided by a secure keyboard communications channel that utilizes the system management mode (SMM) of the processor 102.

Briefly, the preferred embodiment of the black box security device includes the following elements: a command register and decoder; a data/status register for communicating with the computer, an eight byte (or greater) register file to store a power-on password and additional passwords for each of the protected resources, and password verification logic. Commands are preferably issued from the computer to the security device at a predetermined address. Status may be read from the last resource, or slot, indexed. The security device is capable of protecting a plurality of resources or slots.

To verify an encrypted password, first an ACCESS RESOURCES command must be sent to the black box security device. Then, the next eight write operations (or any number of write operations corresponding to the number of bytes in the encrypted password value) to the data/status register cause the byte written to the data/status register to be compared against a byte stored in the security device. If the correct value is provided in each write operation, the resource is unlocked, otherwise the security device is unavailable for one second before the next command can be sent.

The procedure commences in step 300 when the user or an executing application requires access to a secured peripheral device. Control proceeds to step 302 to determine if the peripheral device is in a locked condition pending entry of a valid password. This determination can be made by sending a READ STATUS command to the security device and then reading a data port in the security device to ascertain the status of the peripheral device. Interrupt handling routines or peripheral interface circuitry (not shown) can be utilized to check the status registers of the black box security device.

If the requested peripheral device is not locked as determined in step 302, control passes to step 304 and the peripheral device is accessed in a normal manner. If the peripheral device is locked, control instead passes to step 306 to determine if the user's token 188 is present. If the token 188 is not present, a message is displayed in step 308 requesting that the token be supplied. Control then returns to step 306. Ideally, a maximum time limit is set for this control loop.

If the token 188 is present as determined in step 306, the BIOS handler is directed to send a command to the black box security device requesting access to the secured peripheral device. Control then proceeds to step 312 to determine if the requested resource is permanently locked. Normally, only slots containing the power-on password values and other critical security data are permanently locked. If the resource is permanently locked, control proceeds to step 314 and the access process is aborted.

If the peripheral device is not locked as determined in step 312, control proceeds to step 316 (FIG. 3B) to begin secure communications with the black box security device. As alluded to, certain microprocessors, such as the Pentium® processor from Intel Corporation, have included a mode referred to as system management mode (SMM), which is entered upon receipt of a system management interrupt (SMI). SMIs can be asserted by an SMI timer, by a system request, or by other means. An SMI is a non-maskable interrupt having almost the highest priority in the system. When an SMI is asserted, a microprocessor maps a portion of memory referred to as the system management mode memory ("SMM memory") into the main memory space. The entire CPU state is then saved in the SMM memory in stack-like, last in/first out fashion.

After the initial processor state is saved, the processor 102 begins executing an SMI handler routine, which is an interrupt service routine typically performing system management tasks such as reducing power to specific devices or, as in the case of the present invention, providing security services. While the routine is executing, other interrupt requests are not serviced, and are ignored until the interrupt routine is completed or the microprocessor is reset. When the SMI handler completes its task, the processor state is retrieved from the SMM memory, and the main program continues. An SMI active signal referred to as the SMIACT* signal is provided by the processor to indicate operation in SMM.

Following assertion of its SMI input (this is generally an active low signal), the processor 102 calls the SMI handler, which is stored in and addresses an address space that is separate from ordinary main memory. Thereafter, all memory accesses refer only to SMM memory. Input/output ("I/O") accesses via instructions such as IN or OUT are still directed to the normal I/O address space, however. One advantageous side-effect of the hardwired separate address SMM area is that the routines stored in this space cannot be snooped by the cache, providing an additional layer of protection.

In the disclosed embodiment of the invention, the system management mode is utilized to establish a secure keyboard link allowing a computer user to safely communicate a password or other information to the black box security device. One such mechanism is described in previously incorporated "METHOD AND APPARATUS FOR PROVIDING SECURE AND PRIVATE KEYBOARD COMMUNICATIONS IN COMPUTER SYSTEMS." Briefly, a request for secure keyboard communications causes the computer's processor to enter into SMM. The SMI handler then directs specialized hardware to intercept and divert keyboard interrupts, such that data entered via the keyboard is only communicated to the aforementioned non-readable black box security device. The secured keyboard communications channel prevents critical data entered through a keyboard from being intercepted by malicious software code, such as a virus masquerading as a screen saver or device driver. Keystrokes are not visible to any other processes, and the black box security device can be configured such that it is only written in this manner.

Returning to step 316 of FIG. 3B, appropriate registers in the processor 102 are loaded prior to execution of the SMI code. The register values indicate a request for secured keyboard communications. Control next proceeds to step 318 for generation of an SMI that is essentially a software interrupt (analogous to a BIOS software interrupt call procedure). The SMI in turn places the processor 102 in system management mode. The precise manner in which the SMI is generated is not critical to the invention. The SMI need only be generated such that the SMI handler recognizes that a secure keyboard link is required. Once in SMM, the processor recognizes the type of SMI call that has been initiated by the data stored in the processor 102 registers. Once the request is identified as a request for secured keyboard communications, the SMI handler executes the routine used to intercept a keyboard interrupt. The keyboard interrupt is assumed to be IRQ1 for purposes of this specification.

Control next proceeds to step 320 where the SMI handler sets a secure keyboard bit that functions to activate circuitry for intercepting IRQ1. The secure keyboard bit can only be set while the processor 102 is in SMM, and is therefore secure. Control then proceeds to step 322, where specialized hardware blocks the standard keyboard interrupt IRQ1 normally associated with the keystroke. The character code associated with the blocked interrupt is then encrypted using the encryption algorithm stored in the token 188. Since the keyboard interrupt IRQ1 is blocked, malicious code that awaits this interrupt is never activated. In fact, in the disclosed embodiment, secured key strokes are not visible to any other processes.

Next, in step 324, the encrypted character is directed to the black box security device. Control then proceeds to step 326 and the secure keyboard bit is unset and SMM is exited. Leaving SMM at this stage has certain advantages. For example, minimizing the time spent in SMM aids in maintaining network connectivity. Normal interrupts are not recognized in SMM, which can cause a user to drop off a network. Thus, by not polling for the next character while in SMM, the secured keyboard link can be relatively transparent to normal system operation.

Control next proceeds to step 328 where the status registers of the black box security device are examined to determine if the last encrypted byte of the peripheral password has been entered. If not, control returns to step 316 to repeat the process of obtaining a plain text password character. If the last encrypted byte has been received by the black box security device, control passes to step 330 to determine if the encrypted password value matches the value stored in the black box. If so, control proceeds to step 332 and the requested peripheral device is unlocked.

If the encrypted password as received by the black box device is not correct as determined in step 330, control proceeds to optional step 334 to ascertain if a predetermined maximum number of attempts at entering a correct password has been exceeded. If so, a failure message is displayed in step 336, followed by an exit to normal computer operation in step 338. If the maximum number of attempts has not been exceeded, control passes to step 340 for a delay of one second. This delay reduces the effectiveness of potential brute force attacks against password security. Following the delay, control returns to step 306 and the process of entering a password is repeated.

In one alternate embodiment of the invention, the peripheral password is communicated directly to the secured peripheral device in a manner similar to that discussed in conjunction with FIGS. 2A and 2B. The secure keyboard channel can be utilized in this embodiment of the invention as well. The peripheral device compares the received peripheral password to a value stored internal to the peripheral, and access to the peripheral is granted if the values match. By internally storing the peripheral password value, the peripheral device can be moved to a different computer system while maintaining identical access requirements.

The method disclosed generally in FIGS. 3A and 3B has many potential applications. For example, a computer system or network resources can be configured to have varying levels of access, with each level requiring a distinct password. By utilizing the secure keyboard link, the plain text passwords required to access different features or memory spaces of a secured resource can be entered in a secure fashion without the time delays associated with the secure power-on procedure. The two-piece authentication process can also be configured for use with Plug and Play devices.

Thus, a method has been described for permitting access to secured computer resources based upon a two-piece user verification process. In one embodiment of the invention, the user verification process is carried out during a secure power-up procedure. At some point during the secure power-up procedure, the computer user is required to provide an external token or smart card that is coupled to the computer through hardware. The token or smart card is used to store an encryption algorithm furnished with an encryption key that is unique or of limited production. The computer user is then required to enter a plain text user password. Once entered, the user password is encrypted using the encryption algorithm contained in the external token to create a peripheral password. The peripheral password is compared to a value stored in either secure system memory or in memory contained within a secured resource itself. If the two values match, access to the secured resource is permitted.

In an alternate embodiment of the invention, the two-piece authentication process is conducted during normal computer operation outside of the secure power-on sequence. In this embodiment of the invention, the user password is communicated to secure memory by means of a secure keyboard communications channel.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method for enabling or disabling power in a computer system incorporating circuitry for communicating with an external token that includes a cryptographic algorithm and an encryption key, the computer system further incorporating a secure power-on process or other secure operating mode and a power supply providing at least one power supply voltage to computer system components, the method comprising the steps of:

providing a user password to the computer system;
communicatively coupling the external token to the computer system;
providing the user password to the cryptographic algorithm stored in the token;
encrypting the user password with the cryptographic algorithm and the encryption key to produce a system password;
comparing the system password with a stored value; and
enabling or disabling at least one power supply voltage in response to the result of said step of comparing the system password with a value stored in the computer system.

2. The method of claim 1, wherein said step of providing a user password to the computer system is performed while the computer system is in a secure period of operation.

3. The method of claim 2, wherein the secure period of operation includes a secure power-up procedure.

4. The method of claim 1, wherein said step of comparing the peripheral password with a stored value occurs in secure computer memory.

5. The method of claim 1, wherein said step of comparing the peripheral password with a stored value occurs in the secured computer resource.

6. The method of claim 1, wherein said step of encrypting the user password with the cryptographic algorithm and the encryption key occurs in the token.

7. The method of claim 6, further comprising the step of communicating the peripheral password from the token to the computer system.

8. The method of claim 1, wherein said step of providing the user password to the cryptographic algorithm comprises downloading both the cryptographic algorithm and the user password to secure computer memory, and wherein said step of encrypting the user password with the cryptographic algorithm and the encryption key occurs in secure computer memory.

9. The method of claim 1, wherein the token is a smart card.

10. The method of claim 1, wherein the token is a memory device.

11. The method of claim 1, wherein the encryption key is unique or of limited production.

12. A computer system having security capabilities that operate in conjunction with an external token containing a cryptographic algorithm and an encryption key, comprising:

a system bus;
a processor coupled to said system bus;
communication circuitry coupled to said processor for communicating with the external token;
a power supply providing at least one power supply voltage to computer system components;
security code stored in a processor readable medium such that, upon execution, the processor performs the steps of:
receiving a user password;
providing the user password to the external token;
receiving a system password from the external token, wherein the system password is an encrypted version of the user password;
comparing the system password with a stored value; and
enabling or disabling at least one power supply voltage from said power supply in response to the result of said step of comparing the system password with a value stored in the computer system.

13. The computer system of claim 12, wherein said security code is executed while the computer system is in a secure operating mode.

14. The computer system of claim 13, wherein said secure operating mode is a secure power-on procedure.

15. The computer system of claim 12, wherein said security code step of comparing the peripheral password with a stored value occurs in computer system memory.

16. The computer system of claim 12, wherein said security code step of comparing the peripheral password with a stored value occurs in said secured computer resource.

17. The computer system of claim 12, wherein the external token is a smart card.

18. The computer system of claim 12, wherein the external token is a memory device.

19. The computer system of claim 12, wherein the encryption key is unique or of limited production.

* * * * *